US007594100B2

(12) United States Patent
Cypher et al.

(10) Patent No.: US 7,594,100 B2
(45) Date of Patent: Sep. 22, 2009

(54) EFFICIENT STORE QUEUE ARCHITECTURE

(75) Inventors: Robert E. Cypher, Saratoga, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 184 days.

(21) Appl. No.: 11/540,257

(22) Filed: Sep. 29, 2006

(65) Prior Publication Data

US 2008/0082738 A1    Apr. 3, 2008

(51) Int. Cl.
G06F 7/38       (2006.01)
G06F 9/00       (2006.01)
G06F 9/44       (2006.01)
G06F 15/00      (2006.01)

(52) U.S. Cl. .................................................. 712/225
(58) Field of Classification Search ................ 712/220, 712/225
See application file for complete search history.

(56) References Cited

U.S. PATENT DOCUMENTS

| | | | | |
|---|---|---|---|---|
| 5,894,569 | A | * | 4/1999 | Arimilli et al. ............... 712/225 |
| 6,021,485 | A | * | 2/2000 | Feiste et al. .................. 712/216 |
| 6,141,747 | A | * | 10/2000 | Witt ............................. 712/225 |
| 2001/0034827 | A1 | * | 10/2001 | Mukherjee et al. ........... 712/225 |

FOREIGN PATENT DOCUMENTS

WO         0135212 A1    5/2001

OTHER PUBLICATIONS

Torres et al.; Store Buffer Design in First-Level Multibanked Data Caches; May 2005; ISCA '05.*
Franklin et al.; ARB: A Hardware Mechanism for Dynamic Reordering of Memory References; May 1996; IEEE.*
Stone et al.; Address-Indexed Memory Disambiguation and Store-to-Load Forwarding; Nov. 2005; IEEE MICRO '05.*
Publication: "*Checkpoint Processing and Recovery: Towards Scalable Large Instruction Window Processors*" by H. Akkary, R. Rajwar, S.T. Srinivasan, Proceedings of the $36^{th}$ International Symposium on Microarchitecture (MICRO-36'03) p. 423, IEEE 2003.
Publication: "*Scalable Load and Store Processing in Latency Tolerant Processors*" by A. Gandhi, H. Akkary, R. Rajwar, S.T. Srinivasan and K. Lai, $32^{nd}$ Annual International Symposium on Computer Architecture (ISCA) IEEE Jun. 2005.

* cited by examiner

*Primary Examiner*—Eddie P Chan
*Assistant Examiner*—Corey S Faherty
(74) *Attorney, Agent, or Firm*—Park, Vaughan & Fleming LLP

(57) ABSTRACT

One embodiment of the present invention provides a store queue that applies the stores to a memory subsystem in program order. This store queue includes a content-addressable memory (CAM), which holds pending stores and facilitates looking up stores based on addresses for the stores, wherein the CAM does not keep track of program order between stores to different addresses. The store queue also includes a program-order queue which keeps track of program order between the stores in the CAM and thereby facilitates applying the stores to the memory subsystem in program order. In a variation on this embodiment, the CAM is a priority CAM which holds separate copies of multiple stores with identical addresses, and when a lookup based on an address matches multiple stores, returns the youngest matching store.

27 Claims, 8 Drawing Sheets

EFFICIENT STORE QUEUE ARCHITECTURE

BACKGROUND

1. Field of the Invention

The present invention relates to the design of processors within computer systems. More specifically, the present invention relates to an efficient store queue architecture, which holds pending stores, and applies the stores to a memory subsystem in program order.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load, generates a cache miss, the subsequent access to level-two (L2) cache or memory can require dozens or hundreds of clock cycles to complete, during which time the processor is typically idle, performing no useful work.

In contrast, cache misses during stores typically do not affect processor performance as much because the processor usually places the stores into a "store queue" and continues executing subsequent instructions. However, as computer system performance continues to increase, store queues need to become larger to accommodate relatively larger memory latencies.

Unfortunately, as store queues become larger, it is no longer practical to use conventional store queue designs. Conventional store queue designs typically maintain an array of stores in program order, and provide circuitry to match every incoming load against the array of stores. They also provide circuitry to produce the value of every byte being read from the last written value to that byte in the store queue, which may involve accessing entries for multiple stores. The above-described circuitry increases the complexity of the store queue which becomes a problem as the store queue increases in size.

Some researchers have investigated two-level store queue implementations in which a larger, second level store queue is implemented in RAM and is searched linearly whenever a Bloom filter indicates that a hit may be possible. For example, see [Akkaray03] Akkary, Rajwar and Srinivasan, "Checkpoint Processing and Recovery: An Efficient, Scalable Alternative to Reorder Buffers," *IEEE Micro*, vol. 23, no. 6, pp. 11-19, 2003. Although this two-level store queue is area-efficient, it is also very slow.

Other researchers have investigated using an L1 (level-one) data cache to hold store values before they are applied to the memory subsystem. For example, this technique is described in [Gandhi05] Gandhi, Akkary, Rajwar, Srinivasan and Lai, "Scalable Load and Store Processing in Latency Tolerant Processors," *Intl. Symposium on Computer Architecture*, pp. 446-457, 2005. Unfortunately, this technique decreases the performance of the data cache, because the data cache must hold all of the buffered stores. It also requires a dedicated data cache per strand. Otherwise, further degradation of data cache performance will occur because other strands cannot see the stores until they are removed from the store queue and applied to the memory subsystem—if a memory model such as total store ordering (TSO) is to be supported.

Hence, what is needed is an efficient and practical store queue design which can accommodate larger numbers of stores without the above-described problems.

SUMMARY

One embodiment of the present invention provides a store queue that applies the stores to a memory subsystem in program order. This store queue includes a content-addressable memory (CAM), which holds pending stores and facilitates looking up stores based on addresses for the stores, wherein the CAM does not keep track of program order between stores to different addresses. The store queue also includes a program-order queue which keeps track of program order between the stores in the CAM and thereby facilitates applying the stores to the memory subsystem in program order. (Note that entries in the store queue can be created on a double-word basis. In this case, references to the "same address" or to an "identical address" refer to the same double-word address. Similarly, references to "different addresses" refer to different double-word addresses. More generally, if the store queue creates entries on an N-word basis (where N=1, 2, 4, 8, etc.), references to the same or different addresses in this specification and appended claims refer to the same or different N-word addresses.)

In a variation on this embodiment, the CAM is a priority CAM which holds separate copies of multiple stores with identical addresses, and when a lookup based on an address matches multiple stores, returns the youngest matching store.

In a further variation, the store queue also includes a pipeline CAM which implements the functionality of the priority CAM and also keeps track of program order between stores, but only for a small number of issued stores that have not yet passed the trap stage of an execution pipeline in the processor. When a store passes the trap stage, the store moves from the pipeline CAM to the priority CAM.

In a variation on this embodiment, the store queue also includes a store-queue finite state machine (FSM) which controls the operation of the store queue. This FSM is configured to use ordering information maintained by the program-order queue to remove the oldest store from the priority CAM and to send the oldest store to the memory subsystem.

In a further variation, if a load matches a store in the store queue, the FSM is configured to perform a read-after-write (RAW) bypass which returns a data value for the load from the matching store.

In a further variation, if a load matches multiple stores in the store queue, the FSM is configured to perform a RAW bypass if all of the data being read by the load was written by the youngest matching store, otherwise the FSM is configured to not perform the RAW bypass.

In a variation on this embodiment, each entry for a store in the CAM contains: an address for the store; a dataword for the store; and a mask which indicates which bytes of the data word are to be written by the store.

In a variation on this embodiment, the program-order queue is organized as a first-in-first-out (FIFO) buffer, wherein each entry contains: an address for a store; and an index into the CAM which specifies where an entry for the store is located in the CAM.

In a variation on this embodiment, the CAM is not a priority CAM and is configured not to hold more than one store for the same address.

In a variation on this embodiment, the store queue is configured to merge successive stores which are directed to the same address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

One embodiment of the present invention provides a new design for a store queue, which is based on a high-capacity content-addressable memory (CAM). (This high-capacity CAM can be optionally extended to function as a priority CAM which can store multiple items for the same key value.) This new design also includes a separate "program-order queue" which contains pointers into the CAM. This program-order queue facilitates removing items from the store queue and applying them to the memory subsystem in program order.

This new design produces a store queue which is smaller than a standard store queue. In addition, the latency of load lookups is much better than can be obtained by using a two-level design (such as the design proposed in [Akkary03]) because the new design reads out and compares only a small number of entries (e.g. 8) from the RAM.

The present invention is described in more detail below, but first we describe how the store queue fits into a computer system.

Computer System

Figure 1:
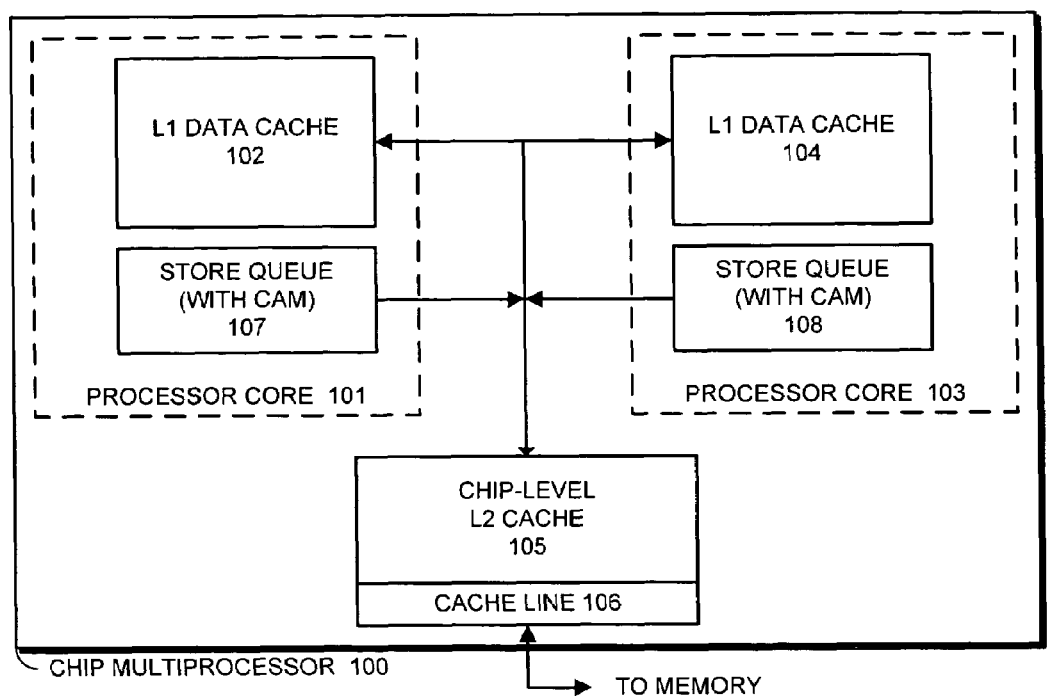
FIG. 1 illustrates a computer system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 108 and 107, which buffer pending store operations.

During a store operation in processor core 101, processor core 101 first performs a lookup for the cache line in L1 data cache 102. If the lookup generates a miss in L1 data cache 102, processor core 101 creates an entry for the store in store queue 107 and sends a corresponding fetch for the store to L2 cache 105.

During a subsequent load operation, processor core 101 uses a CAM structure to perform a lookup in store queue 107 to locate completed but not-yet-retired stores to the same address that are logically earlier in program order. If such a matching store exists, the load operation obtains its value from that store rather than from the memory system. This CAM structure is described in more detail below with reference to FIGS. 2-6.

Store Queue

Figure 2A:
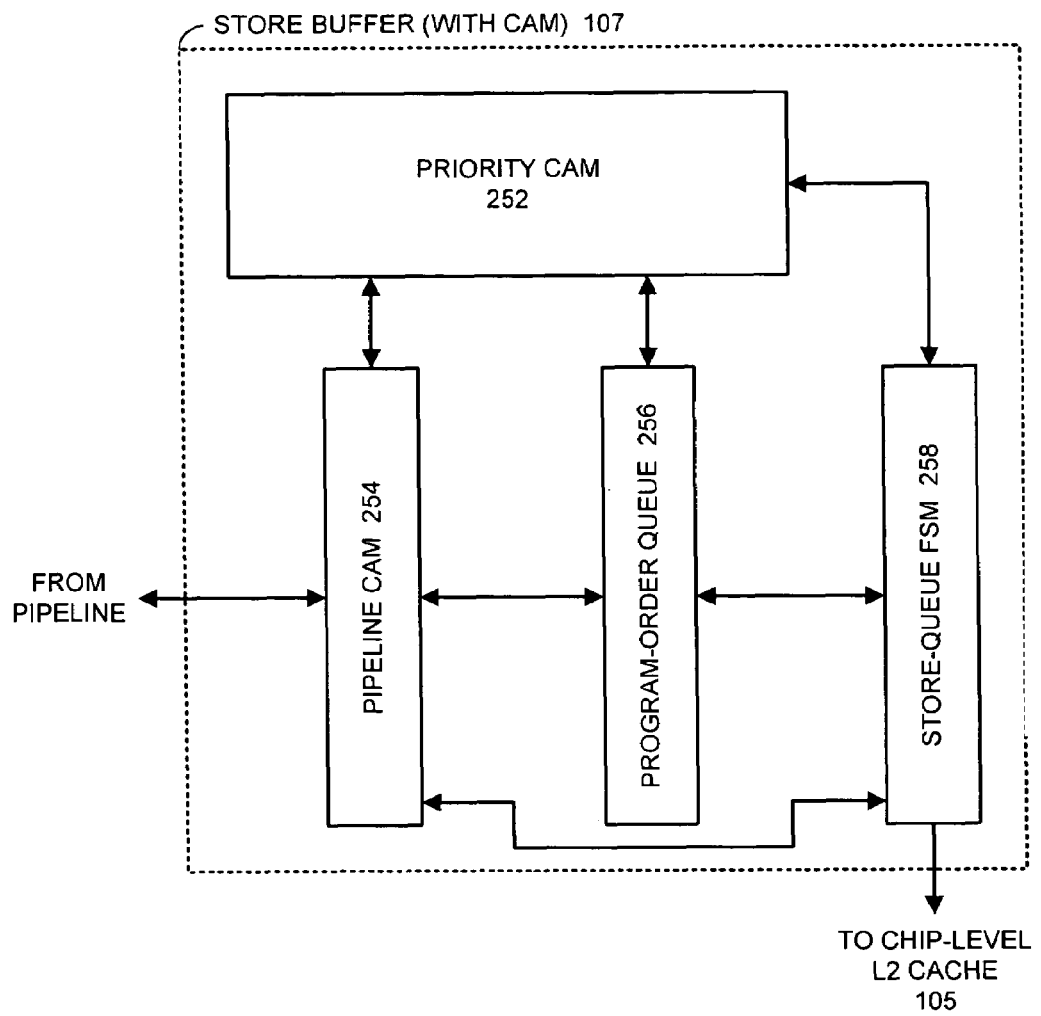
FIG. 2A illustrates a store queue in accordance with an embodiment of the present invention.

FIG. 2A illustrates a store queue that facilitates performing loads and stores in program order in accordance with an embodiment of the present invention. For each load request, the store queue returns the value of the most recent store to the same location from the same processor, if such a store exists in the store queue (or a fail indicator if it is unable to provide such a value). In addition, the store queue applies stores to the memory subsystem in program order, thus supporting the TSO (Total Store Order) memory model (or weaker models such as release consistency).

Referring to FIG. 2A, store queue 107 includes: a priority CAM 252, a program-order queue 256, a pipeline CAM 254 and a store-queue FSM 258. Priority CAM 252 holds pending stores and facilitates looking up these pending stores based on their addresses. Note that when a lookup into priority CAM 252 matches multiple stores, priority CAM returns the youngest matching store. Also note that priority CAM 252 keeps track of program order between stores to the same address, but does not keep track of program order between stores to different addresses.

In another embodiment of the present invention, priority CAM 252 is replaced by a normal CAM, which does not store copies of multiple stores to the same address. In this embodiment, if the system attempts to place a store into the normal CAM, and the store is directed to the same address as a store which already exists in the normal CAM, the system blocks and waits for the preceding store to drain from the normal CAM. This blocking can degrade performance, but the resulting performance degradation can be somewhat reduced by merging successive stores that are directed to the same address. (This can be accomplished by merging the bytes that are updated by the later store into the corresponding dataword and also updating corresponding byte mask bits.)

In addition to priority CAM 252, store queue 107 also includes program-order queue 256, which keeps track of program order between the stores in the CAM, and thereby facilitates applying the stores to the memory subsystem in program order.

Store queue 107 also includes pipeline CAM 254, which implements the full functionality of a small store queue, but only for a small number of issued stores that have not yet passed the trap stage of an execution pipeline in the processor. When a store passes the trap stage, the store moves from pipeline CAM 254 to priority CAM 252. Thus, although pipeline CAM 254 has the full power of a store queue, its bounded size makes it efficient to implement.

Store-queue FSM 258 controls operations performed by store queue 107. In doing so, store-queue FSM 258 uses ordering information maintained by program-order queue 256 to remove the oldest store from priority CAM 252 and to send the oldest store to the memory subsystem.

The operations performed by store queue 107 are described in more detail below.

Store

In one embodiment of the present invention, when the processor pipeline processes a store instruction, it sends a double-word (DW) address, data, and byte mask for the store to pipeline CAM 254. Pipeline CAM 254 holds the store and provides RAW bypasses to subsequent loads until the store reaches the trap stage and is no longer speculative. At this point, pipeline CAM 254 inserts the DW address, data, and mask into priority CAM 252 (with the DW address forming the key and the remainder forming the body of the item being inserted into priority CAM 252). In addition, pipeline CAM 254 sends the DW address to program-order queue 256. Also, priority CAM 252 sends a failure indicator and a corresponding bank ID and index of the item to program-order queue 256.

For each item successfully inserted into priority CAM 252, program-order queue 256 adds a corresponding record containing the DW address, bank ID, and index of the item to the head of its queue (if space is available). In addition, program-order queue 256 asserts a fail signal to both pipeline CAM 254 and store-queue FSM 258 if either it: (1) received a fail signal from priority CAM 252; or (2) was unable to add the required record to the head of its queue because of space limitations. Store-queue FSM 258 uses the fail signal to maintain a count of the number of records in program-order queue 256. Pipeline CAM 254 similarly uses the fail signal to determine whether or not it can remove the corresponding store from its internal CAM. (If it cannot, it asserts a flow control signal indicating that no additional stores can be accepted).

Note that it is possible to perform merging of successive stores to the same DW within pipeline CAM 254 to increase the efficiency of the overall store queue (because the number of items stored is decreased) and to decrease the frequency with which failures are signaled (because the frequency of storing multiple records for the same DW is decreased and the fraction of mask bits set per record is increased).

Memory Update

In one embodiment of the present invention, during a memory update operation a store in the store queue is committed to the memory subsystem and the corresponding entry for the store is removed from the store queue. During this removal process, when store-queue FSM 258 determines that program-order queue 256 is not empty, it asserts a delete signal to program-order queue 256. In response to receiving the delete signal, program-order queue 256 removes the record at the tail of its queue, sends a delete request for the bank ID and index from that record to priority CAM 252, and also sends the DW address from that record to store-queue FSM 258. Note that the delete requests from program-order queue 256 to priority CAM 252 will have to arbitrate with insert and lookup requests from pipeline CAM 254 to priority CAM 252; the arbiter which performs this arbitration is not shown.

When priority CAM 252 receives the delete request, it deletes the specified item and returns the data and mask from the deleted item to store-queue FSM 258. Store-queue FSM 258 then sends the DW address, data, and mask to the memory subsystem where the store is performed and made visible to the other processors. Note that in order to always provide the correct value for loads from the same processor, it is desirable that there not be a window between the removal of a store from priority CAM 252 and the storing of the data to the memory subsystem. This can be accomplished by locking the cache line to which the store is being performed prior to removing the store from priority CAM 252.

Load

In one embodiment of the present invention, when the pipeline processes a load instruction, it sends the double-word (DW) address for the load to pipeline CAM 254. Pipeline CAM 254 provides RAW (Read-After-Write) detection for those stores which are currently in pipeline CAM 254. In addition, pipeline CAM 254 performs a lookup for the DW address in priority CAM 252. During the lookup, priority CAM 252 sends a failure indicator and the data and mask to pipeline CAM 254. In response, pipeline CAM 254 outputs a failure indicator, data and mask.

There are several options for handling loads that hit against multiple stores in the store queue. One simple option is to not allow a RAW bypass from multiple stores unless the youngest such store wrote all of the bytes being read by the load (which can be determined by examining the mask of the youngest such store). With this option, pipeline CAM 254 determines that a multiple hit has occurred if: (1) there is a multiple hit within pipeline CAM 254; (2) if priority CAM 252 signaled a multiple hit, or (3) if both pipeline CAM 254 and priority CAM 252 detected a hit. If pipeline CAM 254 determines that a multiple hit has occurred and that not all of the bytes being read by the load were written by the youngest matching store, pipeline CAM 254 outputs a failure indicator.

Priority CAM

One embodiment of the present invention uses a high-capacity priority CAM to implement the store queue, wherein the high-capacity priority CAM is implemented using a random-access memory (RAM). This high-capacity priority CAM is a modification of the high-capacity CAM described in pending U.S. patent application Ser. No. 11/495,852, entitled "Content-Addressable Memory that Supports a Priority Ordering Between Banks," by inventor Robert E. Cypher, filed 27 Jul. 2006, which is hereby incorporated by reference.

A priority CAM is similar to a normal CAM, except that it can store separate copies of multiple items with identical keys (addresses). When a lookup is performed with a key that matches multiple items in the priority CAM, the youngest such item is returned along with an indication that there are multiple matching entries. When successfully inserting an item, the priority CAM returns the bank ID and index of the location where the item was stored. Then, when deleting an item, the item to be deleted is specified with its bank ID and index, and the body of the item being deleted is returned.

Figure 2B:
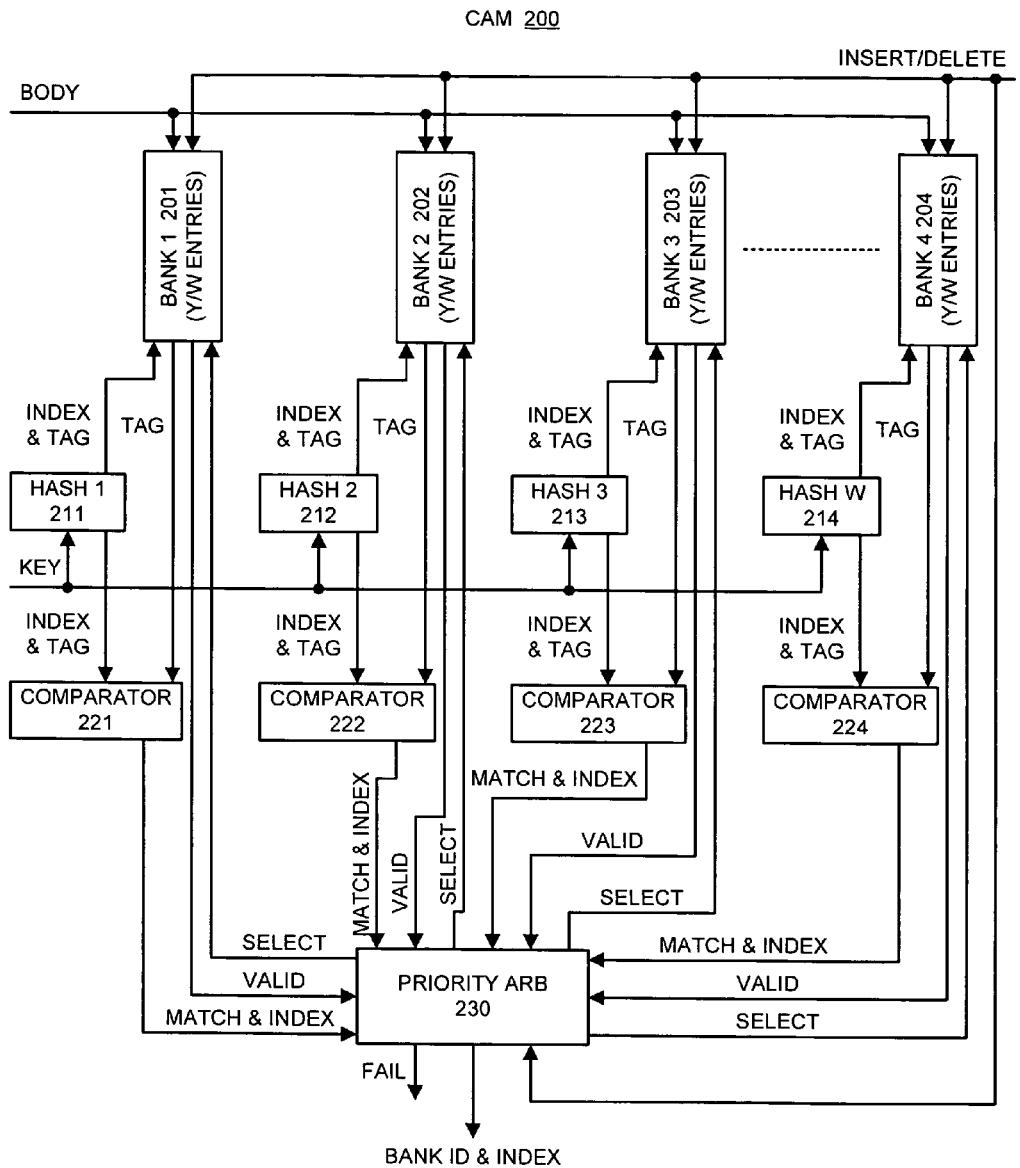
FIG. 2B illustrates a priority CAM during an insert operation in accordance with an embodiment of the present invention.
Figure 2C:
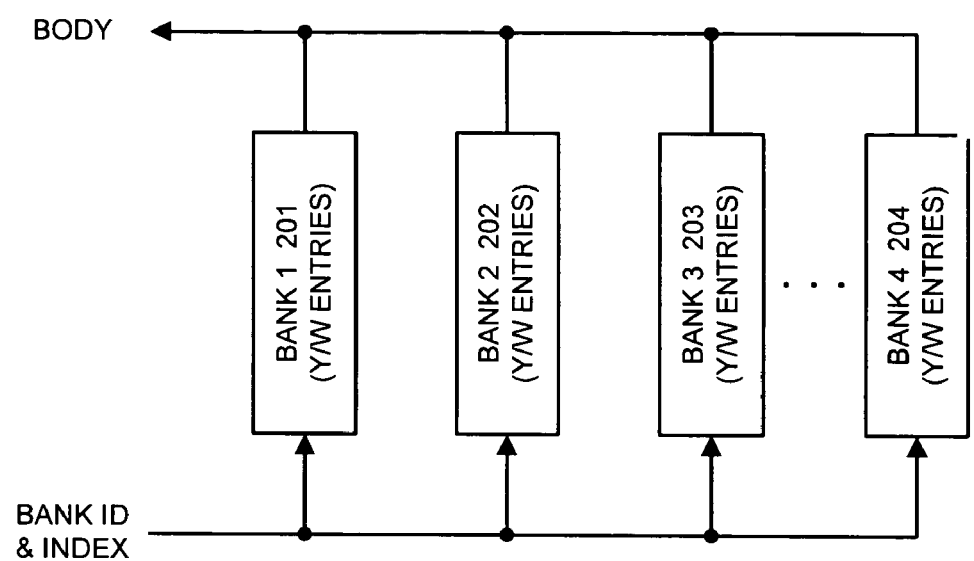
FIG. 2C illustrates the priority CAM during a delete operation in accordance with an embodiment of the present invention.
Figure 2D:
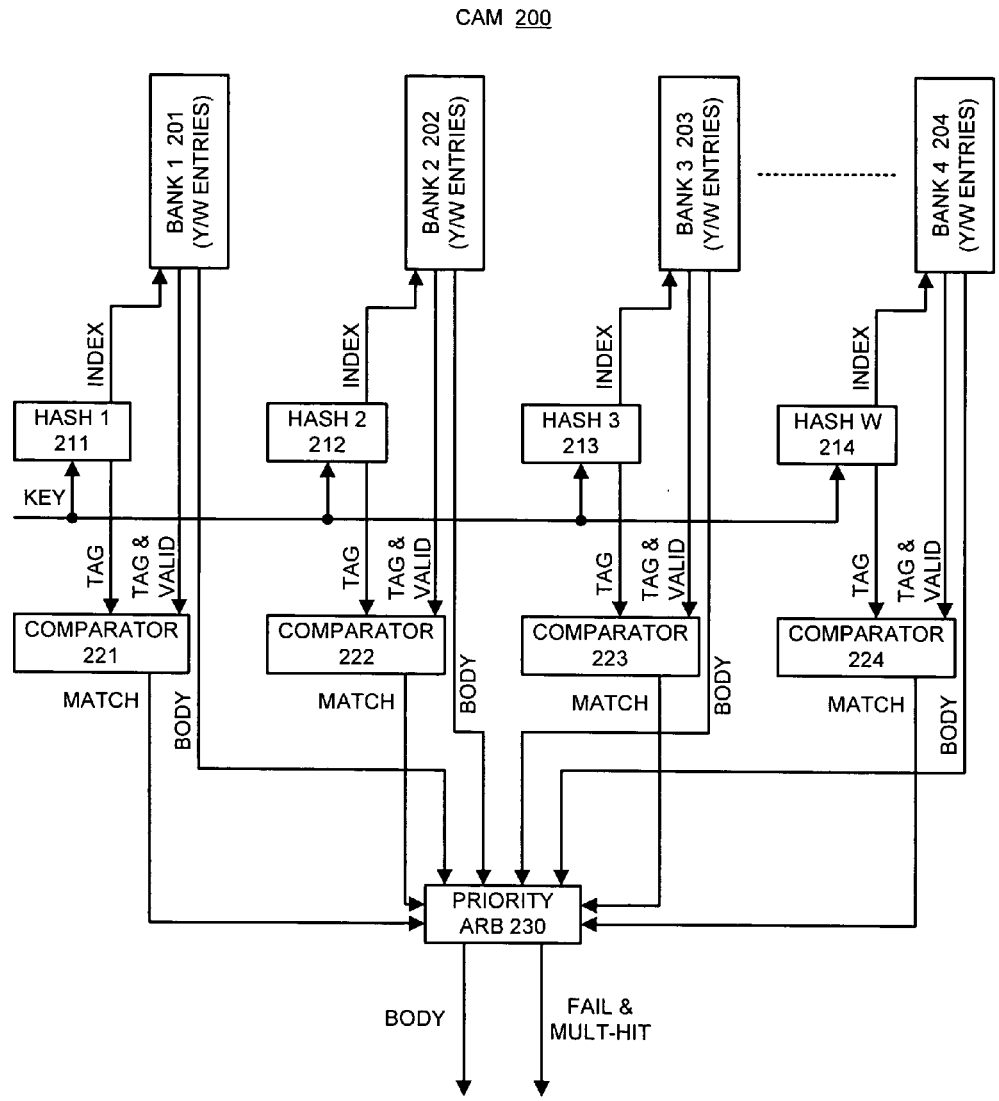
FIG. 2D illustrates the priority CAM during a lookup operation in accordance with an embodiment of the present invention.

The organization of a priority CAM is illustrated in FIGS. 2B-2D for one embodiment of the present invention. Note that while the illustrated priority CAM has banks with identical sizes, it is possible to use banks with different sizes as is described below.

Operations

Like a normal CAM, a priority CAM supports "insert," "lookup," and "delete" operations. These operations are described in more detail below.

Insert Operation

FIG. 2B illustrates a priority CAM organization for an insert operation in accordance with an embodiment of the present invention. In this embodiment, the main storage for the priority CAM is implemented using RAM which stores a total of Y entries, which are divided into W banks with Y/W entries each. Each of these entries includes a tag (derived from a key via a hash function), a body, and a valid flag.

Each bank includes circuitry that computes a different hash function from a key value for each bank. The output from this hash circuitry provides an index and tag, which are used to perform a lookup into the bank.

Each bank also includes a comparator circuit which compares the index and tag computed by the hash circuitry with an index and tag retrieved during the lookup from a corresponding entry in the bank.

Figure 3:
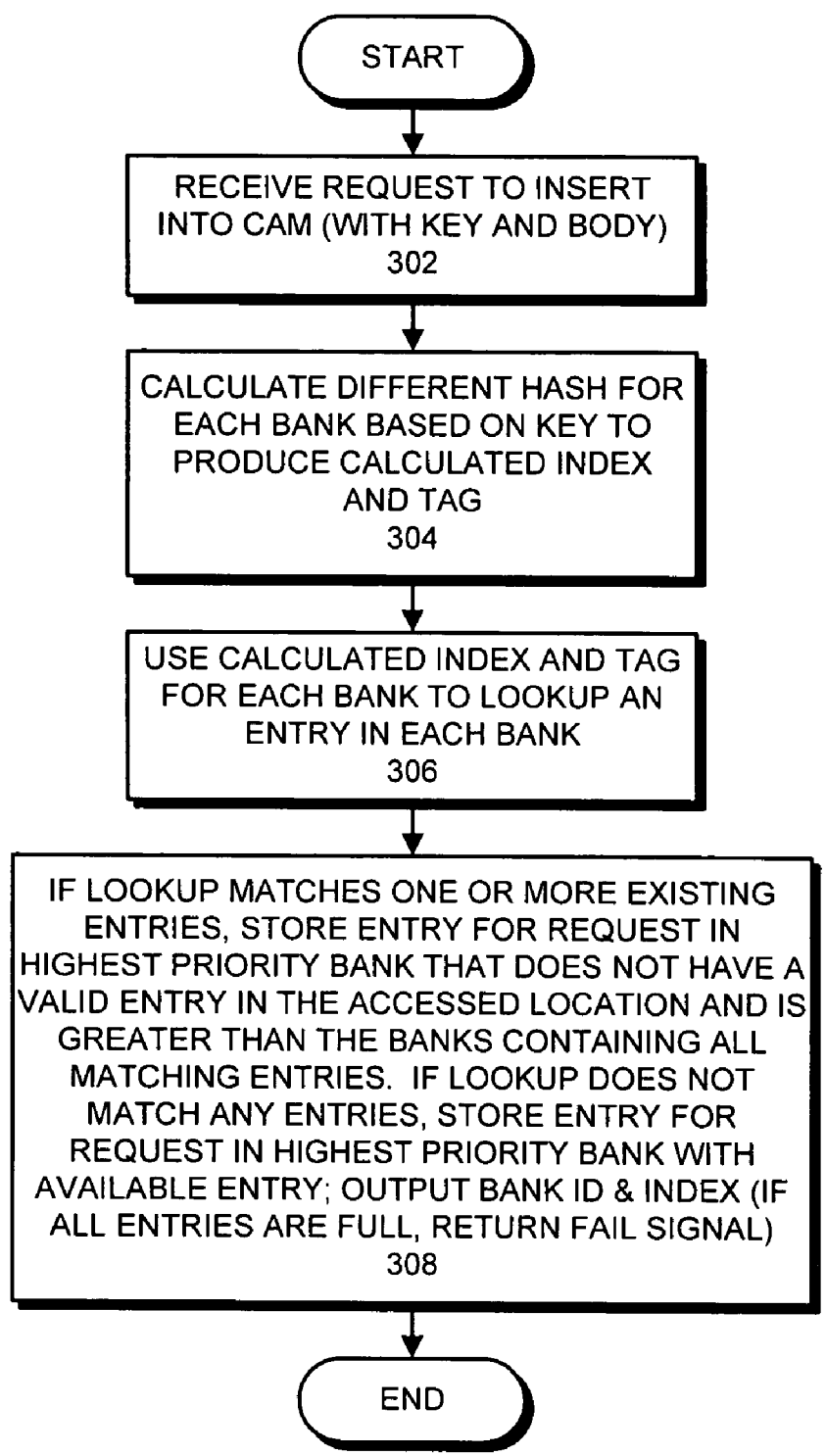
FIG. 3 presents a flow chart illustrating the process of inserting an item into the priority CAM in accordance with an embodiment of the present invention.

Referring to the flow chart in FIG. 3, at the start of an insert operation the system receives a request to insert an item into the priority CAM, wherein the request includes a key and a body (step 302). The key is passed to W hash units, each of which calculates a different hash function and uses the result to determine an index and tag for the item (step 304). The index and tag calculated by each hash unit is passed to the corresponding bank, where the entry with the specified index is read out (step 306). The valid bit read out of each entry is sent to a priority arbiter 230. In addition, the tag read out of each entry is compared to the tag generated by the corresponding hash unit and if they match, a match signal (which indicates a hit) is sent to priority arbiter 230. Finally, the index calculated by each hash unit is passed through the comparator to priority arbiter 230.

Priority arbiter 230 asserts a select signal for the bank to which the item will be inserted and outputs the bank ID and index of the inserted item, or it outputs a fail signal if no such bank exists. Specifically, if there is a match on a valid entry in banks $X_1 \ldots X_k$, priority arbiter 230 asserts the select signal for the lowest numbered bank $Y > X_i$ for all i, $1 \leq i \leq k$, such that Y does not have a valid entry in the accessed location and outputs the bank number Y and the index of the inserted item (or it asserts the fail indicator if no such bank exists). If there is no hit on a valid entry in any of the banks, priority arbiter 230 asserts the select signal to the lowest numbered bank Y which does not have a valid entry in the accessed location and outputs the value Y and the index of the inserted item in bank Y (or it asserts the fail indicator if no such bank exists). Asserting the select signal causes the entry for the request to be stored in the corresponding bank (step 308).

Delete Operation

FIG. 2C illustrates a priority CAM organization for a delete operation in accordance with an embodiment of the present invention. Referring to the flow chart in FIG. 5, at the start of a delete operation, the system receives a request to delete an item from the priority CAM, wherein the request includes a bank ID and index (step 502). Next, the bank ID and index of the item to be deleted are passed to the W banks. Each bank then decodes the bank ID and if it matches the ID of the bank, it uses the index to read out the body of the item to be deleted and then outputs the body (so the body can be committed to the memory hierarchy). It also writes an invalid entry to the specified index (step 504).

Lookup Operation

FIG. 2D illustrates a priority CAM organization for lookup operations in accordance with an embodiment of the present invention. This embodiment uses the same main storage described above, which stores a total of Y entries divided into W banks with Y/W entries each. It also uses the same circuitry that computes a different hash function from a key value for each bank, and uses comparator circuits which are similar to those used in FIG. 2B, except they also receive valid indicators and only signal a match if the valid indicator is asserted.

Figure 4:
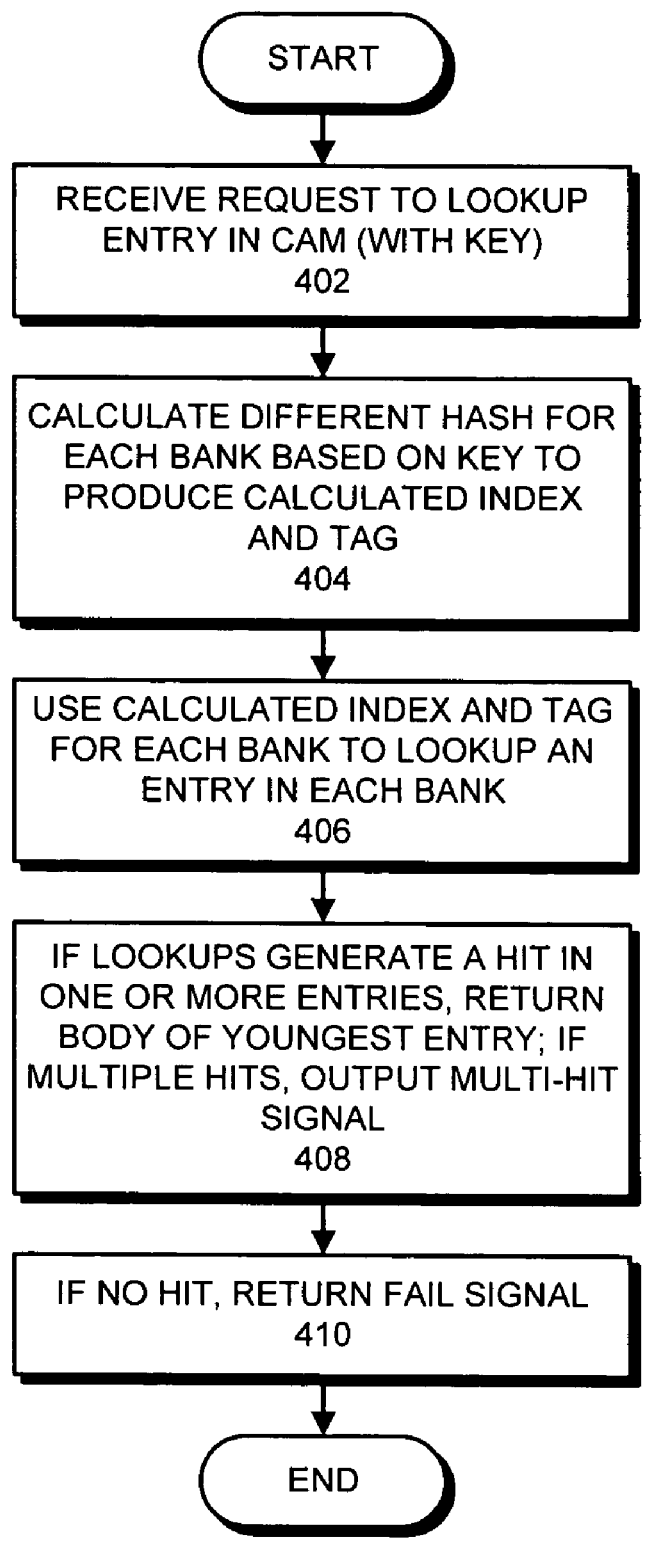
FIG. 4 presents a flow chart illustrating the process of looking up an item in the priority CAM in accordance with an embodiment of the present invention.
Figure 5:
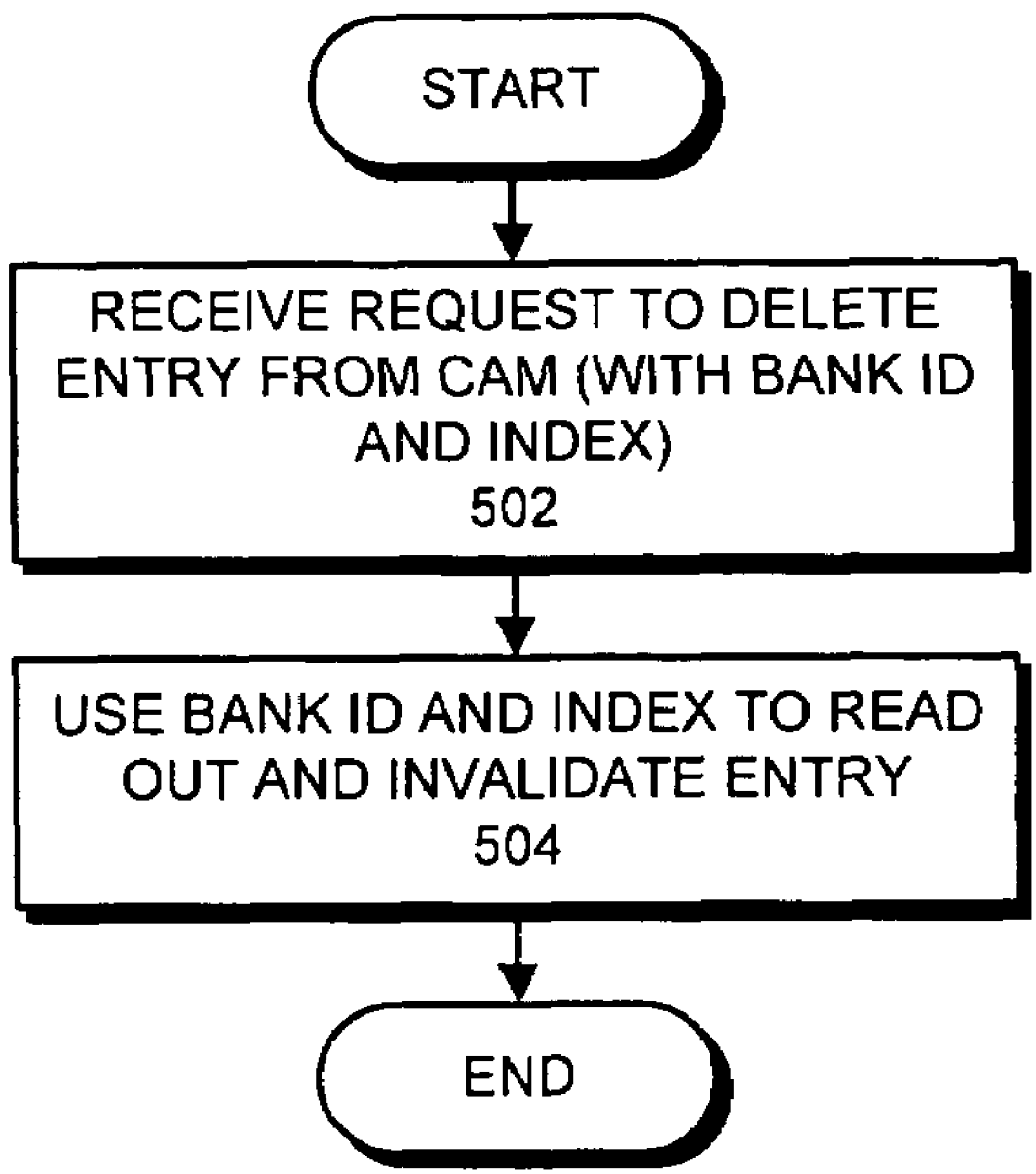
FIG. 5 presents a flow chart illustrating the process of deleting an item from the priority CAM in accordance with an embodiment of the present invention.

Referring to the flow chart in FIG. 4, at the start of a lookup operation, the system receives a request to lookup an item in the priority CAM (step 402), wherein the request includes a key (address). In order to lookup the item in the priority CAM, the key is passed to W hash units, each of which calculates a different hash function and uses the result to determine an index and tag for the item (step 404). The index calculated by each hash unit is passed to the corresponding bank, where the entry with the specified index is read out (step 406). The tag and valid bit read out of each entry is sent to a comparator. In addition, the tag calculated by the hash unit is sent to the comparator and if the tags match and the valid bit was asserted for the entry, a hit indicator is generated.

The hit indicators and bodies are sent to priority arbiter 230 which uses the hit indicators to determine which body to output. Specifically, if there is a hit on a valid entry in banks $X_1 \ldots X_k$, priority arbiter 230 outputs the body from the highest numbered bank $X_i$, where $1 \leq i \leq k$, and it also outputs a multi-hit signal if there were hits on multiple valid entries (step 408). Priority arbiter 230 outputs a failure signal if there were no hits on valid entries (step 410).

Varying Bank Sizes

While the above priority CAM design has much better performance than either a standard set-associative or skewed-associative design, it is possible to improve the performance of this priority CAM design by varying the sizes of the banks. In general, with equal-sized banks the lower-numbered banks will be significantly more full than the higher-numbered banks. As a result, it is possible to scale the sizes of the banks so that higher numbered banks are smaller than (or in some cases equal to) lower numbered banks to increase the number of items that can be stored in the priority CAM. However, care must be taken in selecting the sizes of the banks, because an inability to store an item in the highest-numbered bank has a higher cost (namely the determination that the capacity of the priority CAM has been reached) than an inability to store an item in a lower-numbered bank.

A number of different techniques for scaling the bank sizes can be used. For example, in one technique, the sizes of the banks fall off exponentially from highest to lowest priority, so that if the priority CAM is of size Y and has W banks, the banks can have the following sizes, Y/2, Y/4, Y/8 ..., $Y/2^{(W-2)}$, $Y/2^{(W-1)}$, and $Y/2^{(W-1)}$. In another technique, the sizes of the banks are constant and then fall off exponentially from highest to lowest priority, so that if the priority CAM is of size Y and has W banks, the banks can have the following sizes, Y/4, Y/4, Y/4, Y/8 ..., $Y/2^{(W-3)}$, $Y/2^{(W-2)}$, and $Y/2^{(W-2)}$.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that implements a store queue which holds pending stores and applies the stores to a memory subsystem of a processor in program order, the apparatus comprising:
    a content-addressable memory (CAM) which holds the stores that are pending and facilitates looking up the stores based on addresses for the stores;

wherein the CAM does not keep track of program order between stores to different addresses; and a program-order queue that is organized as a first-in-first-out (FIFO) buffer, wherein each entry in the program-order queue contains an address for a store and an index into the CAM which specifies where an entry for the store is located in the CAM;

wherein the program-order queue is configured to send to the CAM a request which includes the index into the CAM, and in response to the request, the CAM is configured to send data for the store associated with the index, wherein the data for the store associated with the index is committed to memory; and wherein the program-order queue keeps track of program order between the stores in the CAM and thereby facilitates applying the stores to the memory subsystem in program order.

2. The apparatus of claim 1, wherein the CAM is a priority CAM which holds separate copies of multiple stores with identical addresses, and when a lookup based on an address matches multiple stores, returns the youngest matching store.

3. The apparatus of claim 2, wherein storage for the priority CAM is implemented using a random-access memory (RAM).

4. The apparatus of claim 2, further comprising a pipeline CAM which implements the functionality of the priority CAM and also keeps track of program order between stores, but only for a small number of issued stores that have not yet passed the trap stage of an execution pipeline in the processor;

wherein when a store passes the trap stage, the store moves from the pipeline CAM to the priority CAM.

5. The apparatus of claim 1, further comprising a store-queue finite state machine (FSM) which controls the operation of the store queue, wherein the FSM is configured to use ordering information maintained by the program-order queue to remove the oldest store from the priority CAM and to send the oldest store to the memory subsystem.

6. The apparatus of claim 5, wherein if a load matches a store in the store queue, the FSM is configured to perform a read-after-write (RAW) bypass which returns a data value for the load from the matching store.

7. The apparatus of claim 6, wherein if a load matches multiple stores in the store queue, the FSM is configured to perform a RAW bypass if all of the data being read by the load was written by the youngest matching store, otherwise the FSM is configured to not perform the RAW bypass.

8. The apparatus of claim 1, wherein each entry for a store in the CAM contains:
an address for the store;
a dataword for the store; and
a mask which indicates which bytes of the data word are to be written by the store.

9. The apparatus of claim 1, wherein the CAM is not a priority CAM and is configured not to hold more than one store for the same address.

10. The apparatus of claim 1, wherein the store queue is configured to merge successive stores which are directed to the same address.

11. A computer system with a store queue which holds pending stores and applies the stores to a memory subsystem of a processor in program order, the computer system comprising:
a processor;
a memory; and
a store queue within the processor, wherein the store queue includes, a content-addressable memory (CAM) which holds the stores that are pending and facilitates looking up the stores based on addresses for the stores, wherein the CAM does not keep track of program order between stores to different addresses, and a program-order queue that is organized as a first-in-first-out (FIFO) buffer, wherein each entry in the program-order queue contains an address for a store and an index into the CAM which specifies where an entry for the store is located in the CAM;

wherein the program-order queue is configured to send to the CAM a request which includes the index into the CAM, and in response to the request, the CAM is configured to send data for the store associated with the index, wherein the data for the store associated with the index is committed to memory; and wherein the program-order queue keeps track of program order between the stores in the CAM and thereby facilitates applying the stores to the memory subsystem in program order.

12. The computer system of claim 11, wherein the CAM is a priority CAM which holds separate copies of multiple stores with identical addresses, and when a lookup based on an address matches multiple stores, returns the youngest matching store.

13. The computer system of claim 12, wherein storage for the priority CAM is implemented using a random-access memory (RAM).

14. The computer system of claim 12, wherein the store queue further includes a pipeline CAM which implements the functionality of the priority CAM and also keeps track of program order between stores, but only for a small number of issued stores that have not yet passed the trap stage of an execution pipeline in the processor;

wherein when a store passes the trap stage, the store moves from the pipeline CAM to the priority CAM.

15. The computer system of claim 11, wherein the store queue further includes a store-queue finite state machine (FSM) which controls the operation of the store queue, wherein the FSM is configured to use ordering information maintained by the program-order queue to remove the oldest store from the priority CAM and to send the oldest store to the memory subsystem.

16. The computer system of claim 15, wherein if a load matches a store in the store queue, the FSM is configured to perform a read-after-write (RAW) bypass which returns a data value for the load from the matching store.

17. The computer system of claim 16, wherein if a load matches multiple stores in the store queue, the FSM is configured to perform a RAW bypass if all of the data being read by the load was written by the youngest matching store, otherwise the FSM is configured to not perform the RAW bypass.

18. The computer system of claim 11, wherein each entry for a store in the CAM contains:
an address for the store;
a dataword for the store; and
a mask which indicates which bytes of the data word are to be written by the store.

19. The computer system of claim 11, wherein the CAM is not a priority CAM and is configured not to hold more than one store for the same address.

20. The computer system of claim 11, wherein the store queue is configured to merge successive stores which are directed to the same address.

21. A method for operating a store queue which holds pending stores and applies the stores to a memory subsystem of a processor in program order, the apparatus comprising:
- maintaining entries for stores that are pending in a content-addressable memory (CAM) which facilitates looking up the stores based on addresses for the stores;
- wherein the CAM does not keep track of program order between stores to different addresses; and
- maintaining additional entries for stores that are pending in a program-order queue that is organized as a first-in-first-out (FIFO) buffer, wherein each entry in the program-order queue contains an address for a store and an index into the CAM which specifies where an entry for the store is located in the CAM;
- sending from the program-order queue to the CAM a request which includes the index into the CAM;
- in response to the request, sending from the CAM data for the store associated with the index; and
- committing to memory the data for the store associated with the index;
- wherein the program-order queue keeps track of program order between the stores in the CAM and thereby facilitates applying the stores to the memory subsystem in program order.

22. The method of claim 21, wherein the CAM is a priority CAM which holds separate copies of multiple stores with identical addresses, and when a lookup based on an address matches multiple stores, returns the youngest matching store.

23. The method of claim 22, wherein storage for the priority CAM is implemented using a random-access memory (RAM).

24. The method of claim 22, wherein the store queue further includes a pipeline CAM which implements the functionality of the priority CAM and also keeps track of program order between stores, but only for a small number of issued stores that have not yet passed the trap stage of an execution pipeline in the processor;
- wherein when a store passes the trap stage, the method further comprises moving the store from the pipeline CAM to the priority CAM.

25. The method of claim 21, wherein the store queue further includes a store-queue finite state machine (FSM) which controls the operation of the store queue, wherein the FSM is configured to use ordering information maintained by the program-order queue to remove the oldest store from the priority CAM and to send the oldest store to the memory subsystem.

26. The method of claim 25, wherein if a load matches a store in the store queue, the FSM is configured to perform a read-after-write (RAW) bypass which returns a data value for the load from the matching store.

27. The method of claim 26, wherein if a load matches multiple stores in the store queue, the FSM is configured to perform a RAW bypass if all of the data being read by the load was written by the youngest matching store, otherwise the FSM is configured to not perform the RAW bypass.

* * * * *